INVENTORS
William B. Huckabay &
William H. Parker

United States Patent Office 3,286,225
Patented Nov. 15, 1966

---

3,286,225
CONTINUOUS MARINE SEISMIC SURVEYING
William B. Huckabay, Dallas, and William H. Parker, Richardson, Tex., assignors to Rayflex Exploration Company, Dallas, Tex., a corporation of Texas
Filed May 21, 1964, Ser. No. 369,257
12 Claims. (Cl. 340—7)

This invention relates generally, as indicated, to improvements in the art of conducting seismic surveys of water-covered areas, and more particularly, but not by way of limitation, relates to an improved method and apparatus for conducting continuous marine seismic surveys from a moving craft, whereby all phases of the operation are controlled from the craft itself.

This invention is an improvement on the subject matter as disclosed in the copending application of Huckabay et al., Serial No. 232,202, now Patent No. 3,251,027, filed on October 22, 1962, and entitled, "Seismic Exploration."

As is well known in the seismic art, it is common practice to conduct seismic surveys of water-covered areas. In such surveys, a pressure wave is created in the water which travels downwardly and becomes a seismic wave as it enters the earth. The seismic waves reflected from subsurface interfaces travel back upwardly and are reconverted into pressure waves as they re-enter the water. These latter pressure waves are in turn detected by transducers known as hydrophones, whereby information relating to the depth and configuration of subsurface strata may be determined.

Various types of acoustic energy sources have been utilized to create pressure waves in the body of water, such as charges of dynamite and gas guns. In the present system a newer type of pressure wave initiator is preferred. The pressure wave is created by controlled electrical arcing between one electrode and the water which is established as a ground return. This facet of the system was brought out fully in the parent case, Serial No. 232,202, now Patent No. 3,251,027. An electrical energy source of this type is highly useful since it is particularly suited for rapid firing, as required when a continuous seismic survey is being conducted, and such devices have been found to provide an appreciable service life. However, it should be asserted that the herein disclosed method and apparatus can be employed equally as well when other conventional acoustic energy sources are used.

A problem encountered in continuous seismic surveys over water has been the high noise level which is generated in hydrophones as they are moved through the water at the higher rates of speed. Even when hydrophones are constructed so as not to be sensitive to acceleration or bending forces, it still has been found that a string of such hydrophones towed through the water in excess of four or five knots creates an excessive amount of noise which tends to mask the desired signals. The signal-to-noise ratio of a hydrophone towed through the water at about five knots may be as low as one-to-one. Any increase in speed over this rate results in an inordinate increase in generated noise, and usually completely defeats any attempt to analyze the records of detected pressure wave patterns.

The present invention improves the signal-to-noise ratio in continuous marine seismic surveying by periodically stopping or slowing the motion of the towed detector member, so that during a portion of the survey operating cycle the hydrophone array can be dead in the water. During this portion of the cycle, the requisite function of transducing the returned pressure waves can take place with little or no noise interference generated in the hydrophones. The system has the capability of conducting a continuous survey of an area from a craft moving at a substantially constant speed. This is valuable from the aspect of the ease of interpretation of data; from the aspect of rapidly covering an area, and from the aspect of reliability, since a constantly moving craft can maintain a far more true course, thus reducing the amount of time and equipment necessary for maintaining an accurate position-fix of the craft.

An object of the present invention is to provide a seismic exploration system which obtains and makes available for easy analysis the maximum information regarding the subsurface structure.

Another object of the invention is to provide a continuous-type marine seismic surveying system which enables a survey ship to cover a given area in much less time.

A further object of this invention is to improve the signal-to-noise ratio of the pressure wave detection equipment in a continuous-type marine seismic surveying system.

Other objects and advantages of the invention will be evident from the following detailed description when read in conjunction with the accompanying drawings which illustrate the invention.

Figure 1:
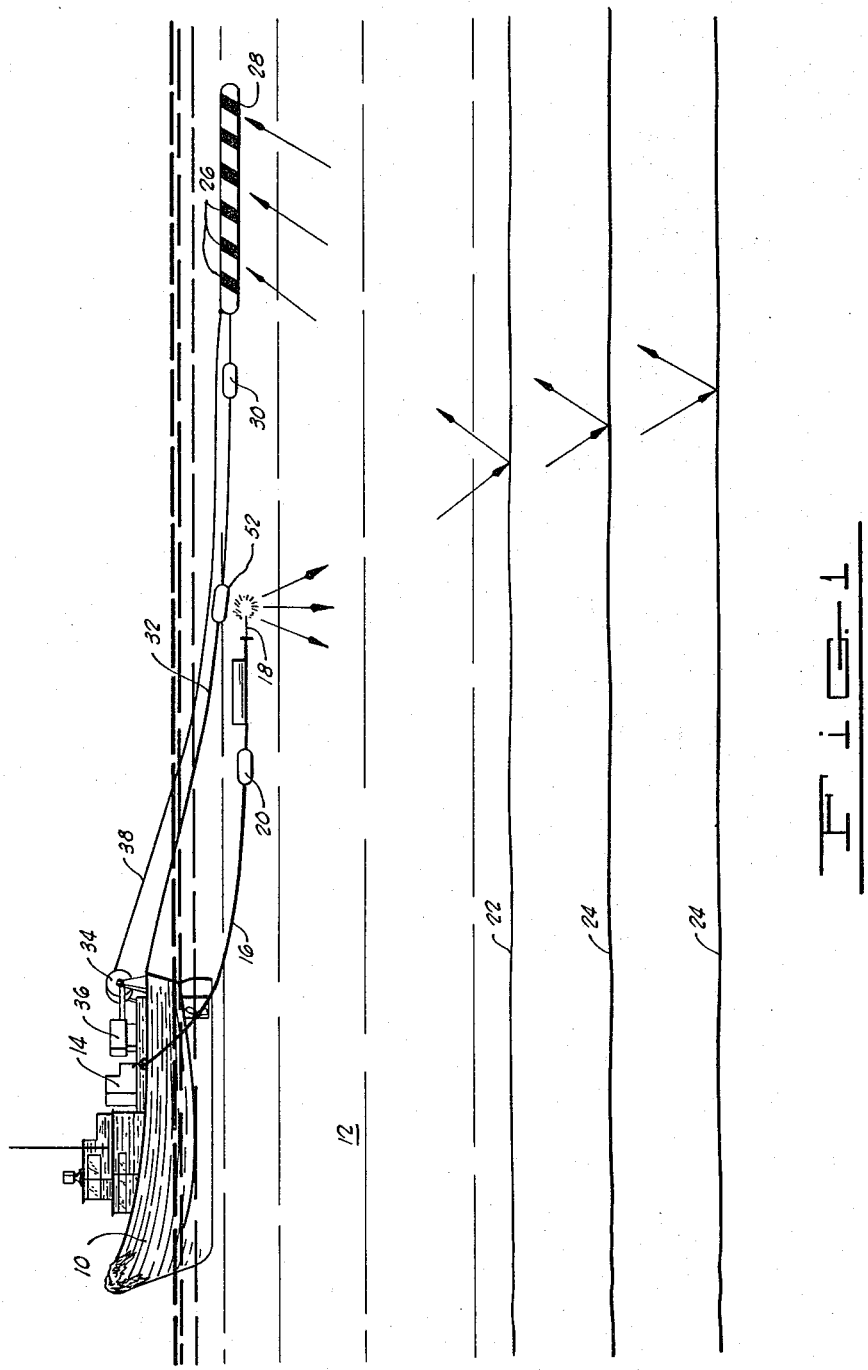
FIG. 1 is a schematic view of a water-covered area being surveyed by a system constructed in accordance with this invention.

Referring to the drawings in detail, and first to FIG. 1, we have shown a vessel or craft 10 which is steered on a predetermined course over a body of water 12. The craft 10 carries a console 14 which contains the necessary power supplies and recording equipment. As previously stated, although other acoustic energy sources could be used, the electric arc type is preferred and will be referred to in the following explanations. Thus a first cable 16 is lowered over the side to tow the electric arcing electrodes 18 as supported or steadied by a float and weight 20 at the desired depth. Cable 16 carries the necessary conductors for the supply of high voltage to the arcing electrodes 18.

When electrodes 18 are fired, a pressure wave is initiated which travels in all directions. In the downward sectors, the pressure travels until it hits the sea bottom 22; whereupon a part of it is converted into a seismic wave. The seismic wave travels on downward through interfaces 24 of the substructure where some portions are reflected and other parts of the energy continue downward and on to dissipation, this depending upon factors of geological formation. The reflected seismic waves (those from each interface) continue upward until they leave the subsurface and take the form of pressure waves once again in the water. These returned pressure waves are detected by a series of spaced hydrophones 26 placed in a streamer 28 and maintained at the desired depth by float and weight 30.

The choice of streamer is very important since, the less the drag of the streamer and cable, the greater the efficiency of the system. A detector streamer having the smallest possible diameter is used; therefore, the water resistance encountered will be as small as possible. A preferred depth, referred to above, has been found to be a depth equal to one-fourth of the wave length of the predominant frequency seismic wave to be detected. This provides a cancellation of undesirable, and a reinforcement of desirable secondary reflections of seismic waves from the water surface. The depth can be maintained fairly accurately by imparting neutral buoyancy to the streamer. This neutral buoyancy can be achieved by filling the streamer with liquid of chosen specific gravity. The detector streamer 28 is towed from the craft 10 by cable 32 which also contains the electrical conductors for transmission of the electrical signals detected by the hydrophones 26.

A cable drum 34 is connected to be driven by motor or engine 36 to rapidly wind-in a tether cable 38. This cable 38 is also connected to the detector streamer 28, and when wound on winch drum 34, serves to wind-in the streamer rapidly, on the order of seconds. When drum 34 releases, cable 38 runs loose, and streamer 28 becomes dead in the water for several seconds until the craft 10 has advanced far enough ahead to once again take up the slack left in cable 32. Hence, a highest possible signal-to-noise ratio is present when each seismic recording is taken, as these periods are synchronized with the periodic stop-motion condition of streamer 28 as it is drawn in and released. Further description as to the periodicity of events is covered below. It should also be apparent that if desired, the functions of cables 32 and 38 can be combined and performed by a single tow cable of design well known in the art.

Figure 2:
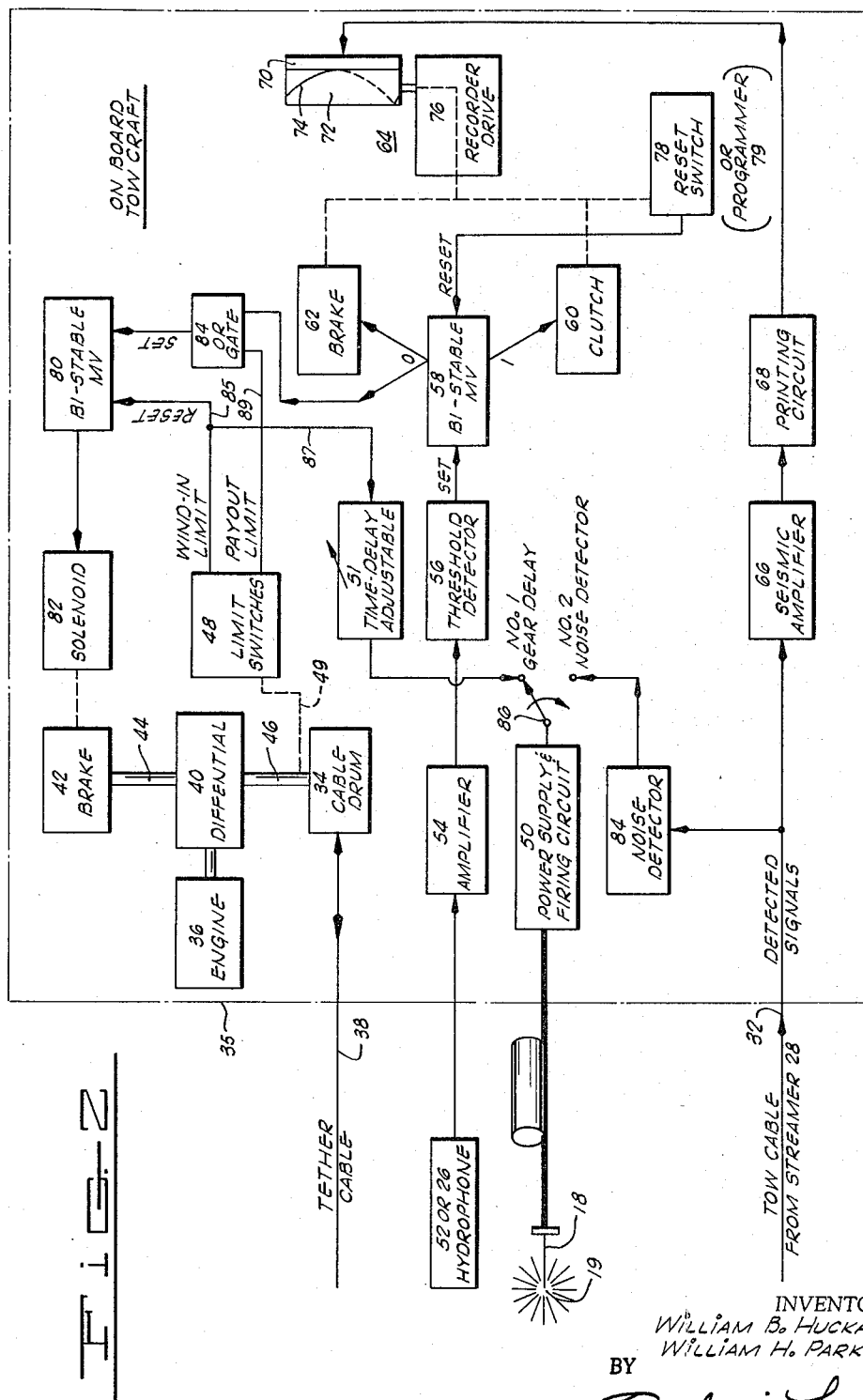
FIG. 2 is a block diagram of an embodiment of the continuous marine seismic survey system.

FIG. 2 depicts an embodiment of the overall system in block form. The dashed outline 35 denotes the equipment contained on-board the tow craft. For example, an engine 36 is connected to drive continually into a conventional differential 40. A brake 42 is provided on one shaft 44 of the differential 40 and the cable drum 34 is secured on the opposite shaft 46. The tether cable 38, wound on the drum 34, is connected to the leading end of the detector streamer 28 and is utilized for the purpose of rapidly drawing the streamer in toward the towing craft as previously indicated.

The differential 40 works in such a manner that when the brake 42 is applied on the respective shaft 44 of the differential, the engine 36 drives the drum 34 in a direction to wind-up or reel-in the cable 38. When brake 42 is released, the drive from engine 36 is through the differential 40 and to the shaft 44 associated with brake 42; since, effectively, a braking-type action will have been applied to the opposite shaft 46 associated with the drum 34 by the streamer-water resistance. Also at this time, the drum 34 can turn freely in the opposite direction, releasing the wind-in force applied to the streamer 28 by paying out the cable 38. This allows the streamer 28 to drift freely behind the craft 10 so that it tends to become dead in the water.

A switch 48 is connected to the drum 34 through a suitable gearing system 49 to energize the firing circuits 50 via wind-in limit conductors 85 and 87 a predetermined period of time after release of the drum 34, when time delay 51 has elapsed. This period of time may be, for example, one second and can be preset to elapse shortly before the streamer 28 has reached its slowest speed in the water. This is an operator adjustment to be made in accordance with the ship's speed and wave conditions.

The pressure wave source in this case is the high voltage arc 19 generated by the arcing electrodes 18. Preferably, the arcing electrodes would take the form of those disclosed in the prior copending case referred to on page one; i.e., a pair of heavy duty, waterproof cables, one having a large water surface contact electrode; the other having a small water surface contact electrode and being partially coated with polyethylene such that as the electrode burns away a new surface is continually exposed.

The power supply, contained in the console 14, provides a very high voltage, 5 kv. or higher. The firing circuit 50 employs an ionic switch (not shown) for application of the high voltage to the arcing electrodes.

A hydrophone 52 is placed in proximity to the arcing electrodes 18 in order to pick up the initial pressure wave with the minimum time delay constant. The signal from phone 52, serving as a synchronizing pulse, can be utilized for initiating other functions of the system on the same time base. If desired, one of the phones 26 (see FIG. 1) in streamer 28 could be used instead of the above phone 52, with an increased time delay constant. This initial signal from the hydrophone is enlarged in amplifier 54, and upon reaching a predetermined amplitude it allows a threshold detector 56 to energize a bistable multivibrator 58. The energizing of the multivibrator 58 induces a signal in the "one" output to initiate engagement of clutch 60 of the recorder. Simultaneously, the other output, i.e., the "zero" output, ceases delivery of a signal to brake 62, thus releasing it, and the recorder 64 starts rotating through its cycle of operation. The recorder 64 will record signals received from the hydrophones 26 (shown in FIG. 1) in streamer 28. These signals are transmitted in the cable 32 to a seismic amplifier 66 and then to printing circuits 68 where they are processed in well-known manner for application to the printer bar 70. It is well to remember at this point that during the recording time the streamer 28 is in a free-float condition, since the tow cable has been slackened just prior to the firing of the arc 19.

Any of several well-known types of recorders may be used with the system. The preferred form in FIG. 2 is an electrosensitive type, having a drum 72 upon which is wound a helical conductor rod 74. With rotation of drum 72, the contact point of helix 74 moves along the printer blade 70 such that a flying-spot type of line scan is traced across an electrosensitive recording paper as it is passed between the helix 74 and printer bar 70. The speed at which the flying-spot is moved can be set by suitable gearing in drive means 76.

FIG. 2 shows a switch 78 for resetting the system. However, it should be understood that the recording cycle of the flying-spot recorder may be controlled by a programmer 79 as disclosed in the copending case, Serial No. 232,202. This mechanism controls the recording sequence such that the reflected signals are recorded only after a predetermined period of time; in order that, only the desired section of subsurface will be recorded on the chart. For purposes of explanation the switch type of reset will be referred to.

When the recording cycle is completed, switch 78, a limit-type arrangement, is closed to enable a reset pulse to the bistable multivibrator 58. This reset pulse reverses multivibrator 58 back to its other or "zero" stable state whereby recorder brake 62 is energized, clutch 60 is disengaged and a brake control pulse is also conducted to energize a bistable multivibrator 80 through OR gate 84. This "set" conduction of multivibrator 80 energizes the solenoid 82 which actuates winch brake 42 to engage the drive to cable drum 34 and once again intiate the winding-in of streamer 28. Multivibrator 80 stays in its "set" conduction phase until limit switch 48 determines that the cable 38 has been wound-in to the original predetermined position; at which time, the wind-in limit signal via conductor 85 resets the multivibrator 80 to its original state, whereby solenoid 82 is de-energized to release the brake 42. The wind-in limit signal from switch 48 is also conducted on line 87 to the adjustable time delay 51 to initiate the arc firing of the next cycle of operation.

A second output, on line 89 from the limit switch 48, also actuates the multivibrator 80 through OR gate 84. After some predetermined number of revolutions of cable drum 34, if electrodes 18 or hydrophone 52 should fail to function, the pay-out limit control via line 89 will turn multivibrator 80 to its "set" position to recycle the operational sequence.

Figure 3:
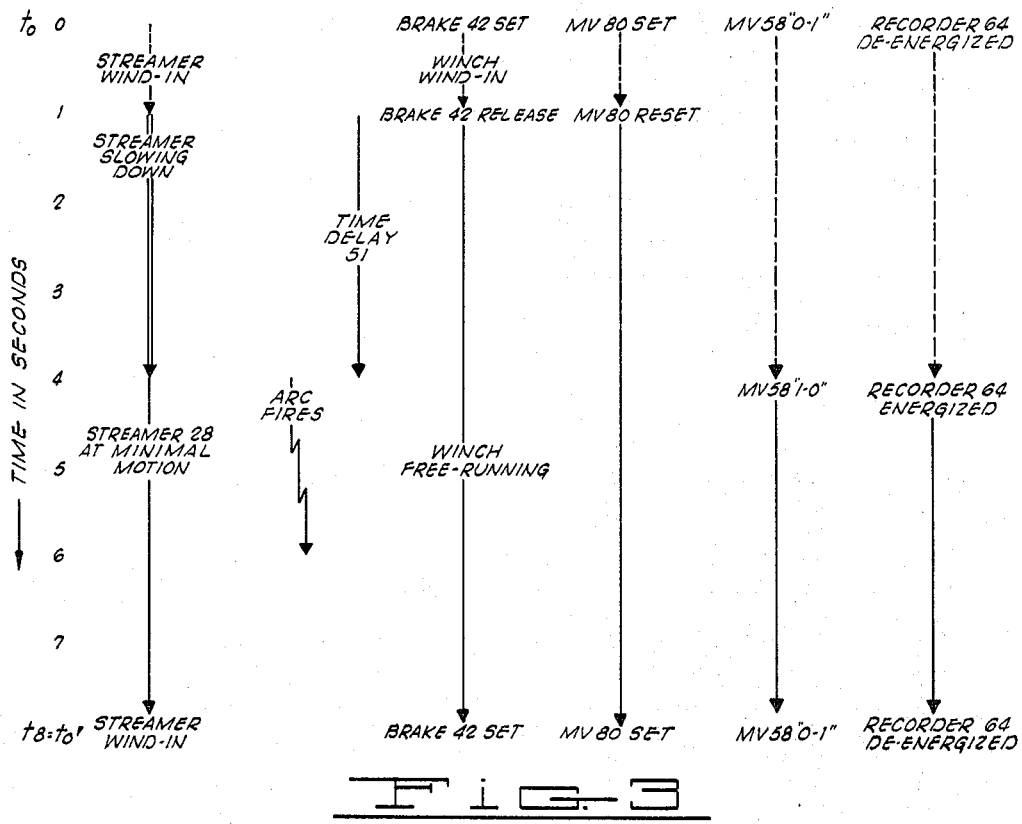
FIG. 3 is a time vs. function graph of the system operation.

Referring now to FIG. 3 there is a pictorial representation of the time vs. various functions of the system. First, it should be stated again that the purpose of the system is to increase the signal-to-noise ratio. This is accomplished by rapidly drawing the streamer toward the craft between each period of recording the reflected wave patterns. Each time the streamer is released, it will tend to become dead in the water. Just before the streamer coasts to its slowest motion, a firing takes place and then the recording of reflected patterns takes place while the streamer is at its rate of least motion.

A cycle having a period of eight seconds has been chosen for illustration, but a larger or smaller period may be selected. At $t_0$ the winch brake 42 is set to begin the rapid wind-in of the streamer. This is brought about when multivibrator 80 is in its "set" conduction, and is released when the cable is rewound to its original position as detected by switch 48 (FIG. 2). A time-delay, controlled by switch 48 and the adjustable time delay 51, allows a short period for the streamer to coast toward a stop and then it energizes the arc firing electrodes 18 to produce the outgoing pressure wave. At this same time bistable multivibrator 58 is caused to change its stable state of operation, thus starting the recorder 64. The recorder remains energized for four seconds and then the recorder limit switch 78 changes the state of multivibrator 58; which multivibrator stops the recorder and once again turns multivibrator 80 to its "set" conduction. Hence, as multivibrator 80 conducts in the "set" position, brake 42 is reset by solenoid 82 and a new cycle of the survey operation begins.

As an alternative to firing the arcing electrodes 18 a predetermined period of time after the wind-in force has been removed from the towing cable 32, a noise detector can be connected to the hydrophone circuit for energizing the firing circuits of the arcing equipment as soon as the detected noise level is reduced to a predetermined value. In FIG. 2, the noise detector 84 and switch 86 pertain to such alternative circuitry. If desired, switch 86 can be set in its No. 2 position, thereby supplying a firing trigger from the noise detector 84 rather than the adjustable time delay 51.

Figure 4:
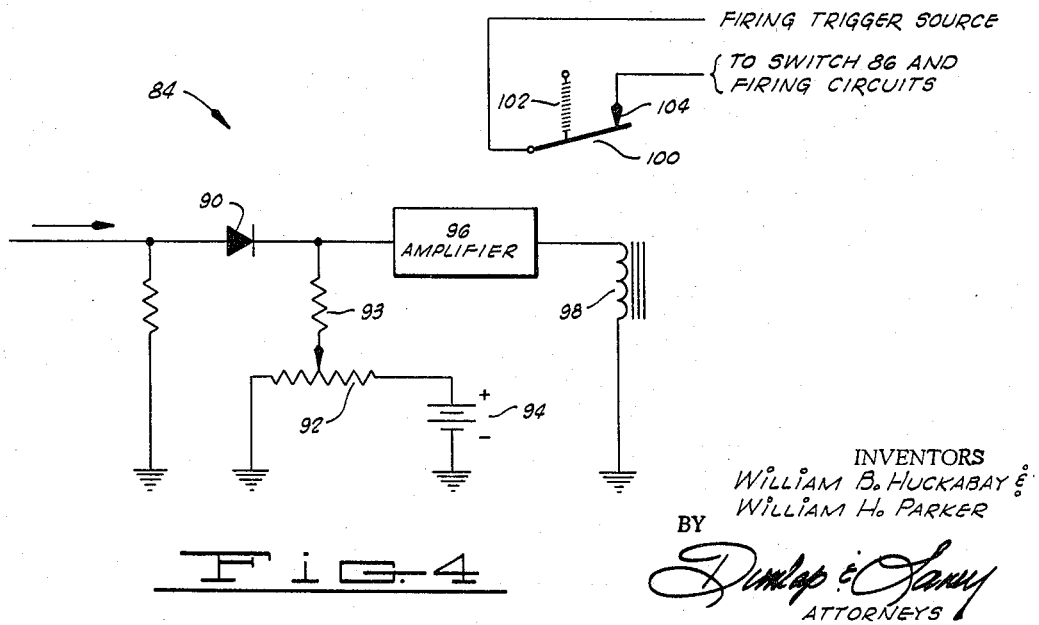
FIG. 4 shows an alternative circuit for initiating arc firing.

FIG. 4 shows the noise detector 84 with greater particularity. This circuit may take the form of a diode 90 having its collector connected to the hydrophone circuit and having its emitter connected through a load resistor 93 to the moving contact of a potentiometer 92. The potentiometer 92 is provided with a bucking voltage from a battery 94 to place a positive bias on the emitter of the diode 90. It will thus be seen that when the level of the signal imposed upon the collector side of diode 90 is reduced to a predetermined level set by potentiometer 92, the signal applied to amplifier 96 is reduced sufficiently to stop the flow of current through the coil of relay 98. When relay 98 releases, the switch 100 is urged by a spring 102 against a contact 104 and causes the transmission of a trigger signal to the firing circuit 50 (FIG. 2. The relay will remain relaxed throughout the recording interval and will energize during the wind-in period since the rapid movement of the hydrophone streamer through the water will once again raise the detected noise voltage to an excessive level.

It is evident then that this invention discloses an improved method and apparatus for marine seismic survey operation, whereby maximum information is obtained about the subsurface structure. By increasing the signal-to-noise ratio, the received signals representing the desired information are greatly accentuated. This, in turn, allows more thorough signal processing and greatly enhances the resulting records of subsurface information.

This invention also enables low noise reception of returned pressure waves from a continuously moving ship, and at speeds heretofore unattainable in seismic survey operations. The equipment is capable of having adjustment to any of its several cycling mechanisms such that the cycle of operation can be easily set for a wide range of ship speeds or weather conditions.

Changes may be made in the combination and arrangement of elements as heretofore set forth in this specification and shown in the appended drawings, it being understood that changes may be made in the embodiments disclosed without departing from the spirit and scope of the invention as defined in the following claims.

We claim:
1. In a system for conducting a continuous seismic survey from a moving craft of a subsurface structure, the equipment comprising:
   means for initiating a pressure wave;
   towed means for detecting reflections of the pressure wave;
   means for rapid wind-in and release of said towed means such that periodic minimal-motion is imparted;
   means for automatically firing said pressure wave initiating means during said minimal motion condition;
   means actuated by the pressure wave initiation for starting a recording cycle; and
   recording means for visually registering the detected reflected pressure waves throughout the recording cycle.

2. The system as defined in claim 1 wherein the means for initiating a pressure wave is an electric arcing means.

3. The system as defined in claim 1 wherein said pressure wave initiating means is fired by a time delay switch, said switch energizing said pressure wave means a predetermined time after release of the wind-in means.

4. The system as defined in claim 1 wherein said pressure wave initiator is fired by a noise detector means, said detector means actuating said pressure wave initiator when the noise level falls below a preset level.

5. The system of claim 1 wherein separate detector means, provided near the pressure wave means, start the recording cycle upon detection of a pressure wave.

6. A system for conducting a continuous marine seismic survey from a moving craft of a subsurface structure, the equipment comprising:
   a detector streamer towed behind the moving craft by a cable,
   arc firing means for initiating a pressure wave in the water,
   engine driven differential means having a cable drum for receiving said tow cable on one output and brake means on the other output,
   solenoid means which upon energization by a first bistable multivibrator is effective to set said brake means and thus impart positive engagement to the cable drum to rapidly wind in the said cable and streamer,
   limit switch means effective to reverse said first bistable multivibrator to release the streamer wind-in at a predetermined streamer position and thus impart a free-float condition to the streamer,
   time delay means effective to control said firing circuitry to energize said arc firing means as the streamer coasts to a rate of least motion,
   recorder means which is energized upon arc firing of the pressure wave to effect a recording cycle during the period of least motion of the streamer, said cycle effected by a detector means responsive to said arc firing to energize a second bistable multivibrator to release a recorder brake and to engage a recorder clutch, thus enabling the recorder drive,
   said recorder means being connected to receive the detected signals from the said streamer,
   reset switch means effective at the completion of said recording cycle to reverse the said second bistable multivibrator to engage the said recorder brake and release the said recorder clutch, thus stopping the recorder drive, and to again reverse the said first bistable multivibrator,
   said first bistable multivibrator initiating a new cycle of operation by again energizing said solenoid means to engage the brake, thus causing the cable drum to wind in the streamer.

7. In a method for limiting the noise-level in a continuous marine seismic survey utilizing detectors towed through water by a craft, including:

rapidly reeling the detectors into a position toward the constant speed towing craft and then releasing the detectors to a free-float condition, the amount of slack in the connection between the detectors and the craft being sufficient to allow production of a pressure wave and detection of the returned signals before the detectors are again set into motion, and automatically producing said pressure wave in accordance with an indication of minimum motion of the detectors and detecting said returned signals coincident with said free float condition.

8. In a method for limiting the noise-level in a continuous marine seismic survey utilizing detectors towed through water by a craft, including:

rapidly reeling the detectors into a position toward the constant speed towing craft and then releasing the detectors to a free float condition, the amount of slack in the connection between the detectors and the craft being sufficient to allow production of a pressure wave and detection of the returned signals before the detectors are again set into motion, and producing said pressure wave automatically when the detector noise-level is established at a predetermined minimum and detecting said returned signals coincident with said free float condition.

9. In a system for conducting from a moving craft a continuous seismic survey of subsurface structure, the equipment comprising:

means for initiating a pressure wave from the moving craft, towed means for detecting reflections of the pressure wave, means for rapidly winding-in said towed means, means releasing the winding means and allowing free drift to the towed means whereupon said towed means approaches a stopped-motion condition, a noise detector for energizing the initiating means when the detected noise falls below a preset level, means for recording the detected reflected pressure wave signals only during said free drift condition, and a time-delay switch for energizing said initiating means a predetermined time after release of said winding means.

10. In a system for conducting from a moving craft a continuous seismic survey of subsurface structure, the equipment comprising:

means for initiating a pressure wave from the moving craft, towed means for detecting reflections of the pressure wave, means for rapidly winding-in said towed means, means releasing the winding means and allowing free drift to the towed means whereupon said towed means approaches a stopped-motion condition, means for recording the detected reflected pressure wave signals only during said free drift condition, and a noise detector for energizing the initiating means when the detected noise falls below a preset level.

11. In a system for conducting from a moving craft a continuous seismic survey of subsurface structure, the equipment comprising:

means for initiating a pressure wave from the moving craft, towed means for detecting reflections of the pressure wave, a motor operated winch effective to rapidly wind-in the towed detector means, said motor driving through a differential having brake means on one output and winch means on the other output and operates such that braking of the first output imparts positive engagement at the second output, means releasing the brake means and allowing free drift to the towed means whereupon said towed means approaches a stopped-motion condition, and means for automatically energizing said means for initiating said pressure wave and for recording the detected reflected pressure wave signals only during said free drift condition.

12. A system as defined in claim 11 wherein said brake is set by a solenoid energized by a bistable multivibrator to initiate the winding-in of the towed detector means.

References Cited by the Examiner
UNITED STATES PATENTS

| | | | |
|---|---|---|---|
| 19,278 | 2/1858 | Brauer | 61—72.3 |
| 2,465,696 | 3/1949 | Paslay | 340—7 X |
| 3,181,644 | 5/1965 | Roever | 181—.5 |
| 3,219,968 | 11/1965 | Loper et al. | 340—7 |

BENJAMIN A. BORCHELT, *Primary Examiner.*

P. A. SHANLEY, *Assistant Examiner.*